(12) United States Patent
Glöckner et al.

(10) Patent No.: US 9,039,948 B2
(45) Date of Patent: May 26, 2015

(54) METHOD AND DEVICE FOR PRODUCING AND TREATING PELLETS

(71) Applicants: Rieter Automatik GmbH, Grossostheim (DE); Bühler Thermal Processes AG, Oberbüren (CH)

(72) Inventors: Frank Glöckner, Aschaffenburg (DE); Fernando Eusebio, Uttwil (CH); Brent Allen Culbert, Will (CH); Franziska Morganti, Zürich (CH)

(73) Assignees: Rieter Automatik GMBH, Grossostheim (DE); Buhler Thermal Processes AG, Oberburen (CH)

( * ) Notice: Subject to any disclaimer, the term of this patent is extended or adjusted under 35 U.S.C. 154(b) by 0 days.

(21) Appl. No.: 13/794,506

(22) Filed: Mar. 11, 2013

(65) Prior Publication Data

US 2013/0256929 A1    Oct. 3, 2013

Related U.S. Application Data

(62) Division of application No. 12/519,073, filed as application No. PCT/EP2007/009769 on Nov. 12, 2007, now Pat. No. 8,435,023.

(30) Foreign Application Priority Data

Dec. 12, 2006   (DE) .......................... 10 2006 058 510

(51) Int. Cl.
*B29B 9/12* (2006.01)
*B29B 9/16* (2006.01)

(52) U.S. Cl.
CPC .... *B29B 9/12* (2013.01); *B29B 9/16* (2013.01)

(58) Field of Classification Search
CPC .... B29B 9/16; B29B 2009/165; B29C 31/00; B65G 47/51; B65G 47/5195
USPC ............... 264/40.1, 40.7, 140, 141, 142, 143, 264/144; 425/136, 140, 143, 145, 147
See application file for complete search history.

(56) References Cited

U.S. PATENT DOCUMENTS

| | | | | |
|---|---|---|---|---|
| 3,544,525 | A | * | 12/1970 | Balint et al. ................... 264/142 |
| 4,570,783 | A | * | 2/1986 | Newcom et al. ............ 198/347.1 |
| 2005/0056961 | A1 | * | 3/2005 | Bonner ......................... 264/143 |

FOREIGN PATENT DOCUMENTS

DE    102005010706 A1    9/2006

* cited by examiner

*Primary Examiner* — Timothy Kennedy
(74) *Attorney, Agent, or Firm* — Michael J. Bujold; Davis & Bujold, P.L.L.C.

(57) ABSTRACT

The invention relates to a method and a device for producing and treating plastic pellets. According to said method, a melt of the plastic material is granulated to give pellets, the pellets are cooled in a cooling fluid, the pellets are separated from the cooling fluid and the pellets are crystallized. The device according to the invention is characterized by comprising a control unit which monitors the crystallization step and controls the method in such a manner that, in case of a disturbance of crystallization, the pellets are supplied to an intermediate storage alter separation of the pellets from the cooling fluid and, as soon as the disturbance is removed, the pellets temporarily stored in the intermediate storage are supplied to crystallization and are crystallized.

18 Claims, 4 Drawing Sheets

METHOD AND DEVICE FOR PRODUCING AND TREATING PELLETS

This application is a division of application Ser. No. 12/519073, filed Dec. 2, 2009, now U.S. Pat. No. 8,435,023, filed as the national stage of PCT/EP2007/09769 on Nov. 12, 2007.

The invention relates to a method. and a device for producing and treating pellets made of plastic material.

Methods of this type customarily include the steps of granulating a melt of the plastic material to form pellets, cooling the pellets in a cooling fluid, separating the pellets from the cooling fluid and further treating the pellets, in particular crystallizing the pellets.

In producing and treating pellets made of plastic material, in particular pellets made of polymers of thermoplastic polyesters or copolyesters, such as PET, which are producible according to the prior art, for example by underwater strand granulation or underwater granulation, it is customary to place the pellets in a cooling fluid for a short period of time,. to separate this cooling fluid as quickly and effectively as possible from the pellets and to supply the pellets to a crystallization unit for the purpose of crystallizing the pellets. Pellets made of plastic material may customarily be reliably further processed only after crystallization, since they have largely amorphous surfaces prior to crystallization and therefore have a tendency to stick together at relatively high temperatures above the material's glass transition temperature, which makes it difficult to further process and handle such pellets, which have not yet been crystallized or at least have not yet been crystallized on their surfaces, or which makes such processing and handling impossible, due to the tendency of the pellets to easily stick together. If a disturbance of crystallization occurs during the method of producing such pellets, or if a corresponding crystallizer even fails completely, the entire process must be interrupted, and any melt present in the corresponding device or any already granulated but not yet crystallized pellets must be disposed of at high cost, which makes continuous pellet production difficult or impossible.

A method for the thermal treatment of polyester pellets is known from German unexamined patent application DE 10 2005 010 706 A1, in which a polyester melt is supplied to an underwater granulator and granulated, and the pellets are subsequently dried and subjected to a crystallization step, a thermal treatment resulting in the partial crystallization of the pellets being carried out by means of the heat present in the pellets. After being crystallized in this manner, the crystallized pellets are now suitable for further processing and may be supplied to an additional post-processing unit or a silo via a pellet distributor.

An object of the present invention is to provide a method and a device for producing and treating pellets made of plastic material which overcome the disadvantages of the prior art and, in particular, make it possible to safely and reliably manufacture pellets even when disturbances of crystallization occur.

The object is achieved according to the invention by a method having the features according to claim 1 as well as by a device having the features according to claim 13. Preferred embodiments are defined in the respective subordinate claims.

The method according to the invention for producing and treating pellets made of plastic material includes the following steps:

Granulating a melt of the plastic material to form pellets;
Cooling the pellets in a cooling fluid;
Separating the pellets from the cooling fluid;
Crystallizing the pellets.

According to the invention, this method provides a control unit which monitors at least the crystallization method step and controls the method in such a manner that, in case of a disturbance of crystallization, the pellets are supplied to an intermediate storage after separation of the pellets from the cooling fluid and, once the disturbance has been removed, the pellets temporarily stored in the intermediate storage are supplied to crystallization and. are crystallized.

The method according to the invention therefore ensures that the pellets may be reliably produced and treated even if disturbances occur during crystallization. If a disturbance occurs in the crystallization step after the pellets have been separated from the cooling fluid, the pellet stream is diverted and stored, according to the invention, in such a way that, once the disturbance has been removed, the temporarily stored pellets are supplied from the intermediate storage to crystallization and may be crystallized.

On the whole, it is possible to implement a method for producing and treating pellets in the manner according to the invention, whereby no excessive amounts of waste is produced even prior to crystallization or if disturbances occur in the crystallization step or if the crystallization, step fails, and the method according to the invention may be continued particularly easily after the disturbance has been removed.

The method according to the invention is particularly effective in the production and treatment of pellets made of plastic material, the plastic material preferably being a crystallizable, thermoplastic condensation polymer, such as polyamide, polyester, polycarbonate, polyactide, polyhydroxyalkanoate or its copolymers or compounds, in particular, polyethylene terephthalate or one of its copolymers.

In the method according to the invention, the control unit may be used to decrease the temperature of the cooling fluid to a temperature $T_2 < T_1$ in the case of a disturbance of crystallization, temperature $T_1$ being an original temperature of the cooling fluid in the case of no disturbance of crystallization. The cooling fluid temperature may preferably be decreased to such a temperature $T_2$ in such a manner that the pellets present in the cooling fluid are cooled such that the temperature of the pellets supplied to the intermediate storage following the separation step lies within a range in which the pellets do not stick together, at least not on their surfaces.

By suitably selecting the temperatures, in particular at suitably low temperatures, the pellets may be temporarily stored with particular ease and reliability in the intermediate storage without sticking together, the as yet uncrystallized pellets being able to have an amorphous structure therein, at least on their surfaces.

A temperature setting is preferred, whereby the control unit lowers the average temperature of the pellets from a temperature $T_3$ to a temperature $T_4 < T_3$ in the case of a disturbance of crystallization, temperature $T_3$ corresponding to an average pellet temperature prior to crystallization in the case of no disturbance of crystallization, and temperature $T_4$ corresponding to an average pellet temperature prior to the intermediate storage, and $T_4$ lying within a range in which the pellets do no stick together in the intermediate storage. This enables pellets to be manufactured safely and reliably in a particular manner with the aid of such a method carried out according to the invention, since it is possible to particularly reliably prevent the pellets diverted to the intermediate storage from sticking together.

In the case of a disturbance of crystallization, the control unit may be used to decrease the average temperature of the pellets from a temperature $T_3$ to a temperature $T_4 < T_3$ after separation of the pellets from the cooling fluid, temperature $T_3$ lying within a range in which the pellets stick together in the intermediate storage and temperature $T_4$ lying within a range in which the pellets do not stick together in the intermediate storage.

Temperature $T_4$ may lie below the glass transition temperature of the plastic material, preferably below 80° C., more preferably below 60° C.

Temperature $T_3$ may lie above the glass transition temperature of the plastic material, preferably above 80° C., more preferably above 100° C.

If the disturbance of crystallization is removed, the control unit may be used to increase the average temperature of the pellets from a temperature $T_4$ to a temperature $T_5 > T_4$, temperature $T_5$ corresponding to an average pellet temperature prior to crystallization in the case of no disturbance of crystallization, preferably and essentially corresponding to temperature $T_3$.

The sequence of the method according to the invention may thus be continued without the pellets sticking together, which, in particular, ensures a safe and reliable manufacture of the pellets according to the invention, in particular when crystallization works "normally" again following crystallization failure.

In the method according to the invention, the pellet temperature may be decreased and/or increased by increasing or decreasing the temperature of at least a portion of the cooling fluid.

In the method according to the invention, the pellet temperature may also be decreased and/or increased by increasing or decreasing the contact time with at least a portion of the cooling fluid.

In the method according to the invention, once the disturbance has been removed, the pellets temporarily stored in the intermediate storage are preferably supplied to crystallization in such a manner that these pellets are mixed with additional pellets which are then supplied to crystallization according to the fault-free process, in a quantity of up to 20% of a total mass flow of the pellets supplied to crystallization, preferably in a quantity of up to 10% of a total mass flow of the pellets supplied to crystallization, more preferably in a quantity of 5% to 10% of a total mass flow of the pellets supplied to crystallization. The quantity of pellets temporarily stored in the intermediate storage is therefore gradually supplied to the "normal" process after separation of the pellets from the cooling fluid and before the pellets are crystallized.

In addition to gradually supplying the temporarily stored pellets, it is also possible in the method according to the invention to preferably first supply all pellets temporarily stored in the intermediate storage to crystallization after the disturbance has been removed and to subsequently supply additional pellets according to the fault-free crystallization process.

Both gradually supplying the temporarily stored pellets and supplying all pellets to the crystallization step once the disturbance of crystallization has been removed makes it possible, according. to the method according to the invention, to preferably enable safe and reliable production of pellets that do not hinder the process by sticking together even in the case of a temporary disturbance in the crystallization step.

The device according to the invention for producing and treating pellets made of plastic material includes a granulation device for granulating a melt of plastic material to form pellets, the granulated pellets being coolable by a cooling fluid, preferably in a cooling device for cooling the pellets in the cooling fluid, the pellets being preferably guided in the cooling fluid after granulation; the device also includes a separation device for separating the pellets from the cooling fluid and a crystallization device for crystallizing the pellets. The device according to the invention also includes a diverting device situated between the separation device and the crystallization device, this diverting device being connected to an intermediate storage for the pellets diverted by the diverting device. The diverting device is controllable by a control unit, by means of which at least the crystallization device may be monitored, in such a manner that, in the case of a disturbance of the crystallization device, the pellets may be supplied to the intermediate storage and, once the disturbance has been removed, the pellets temporarily stored in the intermediate storage may be supplied to the crystallization device. According to the invention, the pellets may be supplied to and from the intermediate storage by transporting them, for example, in an air flow, or by a mechanical transport system in the form of worms, conveyor units of a known type or the like. By means of the device according to the invention, it is possible, during the production and treatment of pellets made of plastic material, to safely and reliably manufacture the pellets even if a crystallization device or crystallizer fails.

According to the invention, the diverting device is preferably designed in such a manner that the pellets temporarily stored in the intermediate storage may be supplied to the crystallization device via the diverting device. As a result, the pellets follow the same route to the intermediate storage and from the intermediate storage via the correspondingly designed diverting device. This makes it possible to provide a particularly simple and also cost-effective design of the device according to the invention.

In other respects, the advantages and features described in connection with the method according to the invention may be implemented by the device according to the invention. Where applicable, the description in connection with the method according to the invention also applies in the same manner to the device according to the invention. In particular, the device according to the invention is able to carry out the method according to the invention.

Table 1 shows a function grid that illustrates the method according to the invention by way of example.

TABLE 1

|  | Cooling fluid temperature | Crystallization device | Intermediate storage | Waste container (optional) | Diverting device |
| --- | --- | --- | --- | --- | --- |
| Normal operation | ≥80° C. | Operating 100% | Empty | Empty | From separation device to crystallization device |
| Temperature decrease | Decrease to ≤60° C. | Disturbance | Empty | Being filled | To waste container |
| Storage mode | ≤60° C. | Maintenance | Being filled | Drain | To intermediate |

TABLE 1-continued

|  | Cooling fluid temperature | Crystallization device | Intermediate storage | Waste container (optional) | Diverting device |
|---|---|---|---|---|---|
| Increase temperature | Increase to ≥80° C. | Standby | Filled | Being filled | storage To waste container |
| Recirculation mode | ≥80° C. | Operating 100% | Being emptied | Drain | Supply up to 20% to crystallization device from intermediate storage |
| Normal operation | | | Same as above | | |

The invention is explained below on the basis of preferred embodiments which are not limiting and are provided by way of example, including reference to the attached figures, where:

Figure 1:
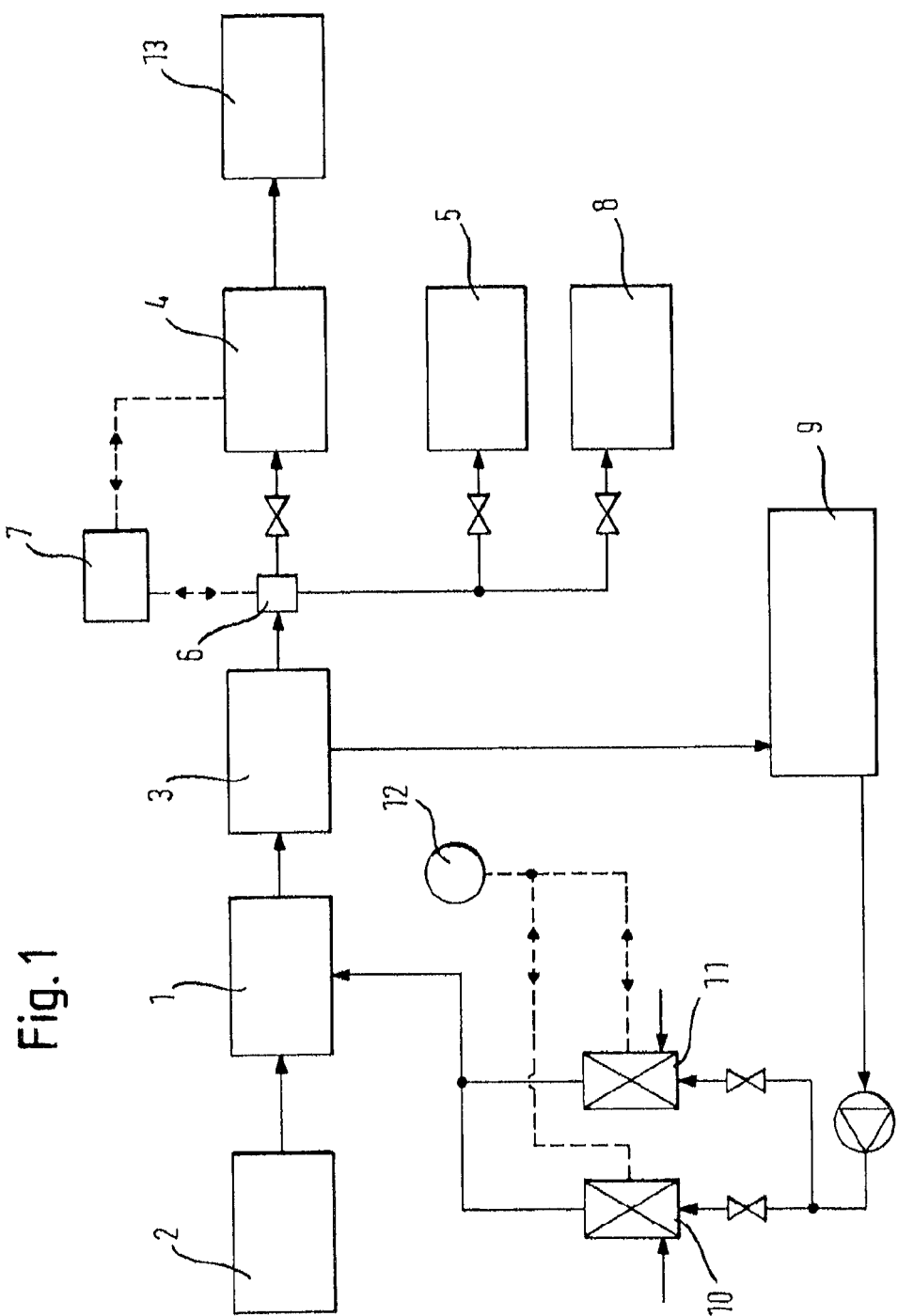
FIG. 1 shows a schematic view of a device for producing and treating pellets made of plastic material according to one embodiment of the invention.

FIG. 1 shows a schematic layout of a device according to the invention for producing and treating pellets made of plastic material according to one embodiment of the invention, the solid. arrows indicating the path of the plastic material or pellets as well as the path of the cooling fluid. According to FIG. 1, the device according to the invention includes a granulation device 1 for granulating a melt of the plastic material to form pellets, the melt of the plastic material being supplied from a reactor or extruder 2 to granulation device 1. After the granulation step in granulation device 1, the granulated pellets are cooled by a cooling fluid, preferably in a cooling device for cooling the pellets in the cooling fluid, the pellets being preferably transported away from granulation device 1 in the cooling fluid. Cooling water or suitable gases are preferably used as the cooling fluid. The cooling fluid and pellets enter a separation device 3 for separating the pellets from the cooling fluid, i.e. the pellets are separated from the cooling fluid and dried accordingly. A generally known diverting device may be provided as separation device 3, for example a centrifugal drier. Devices of this type are generally known to those skilled in the art and are therefore not described in greater detail here. During normal operation of the device according to the invention (i.e. if no disturbance occurs in crystallization device 4), the pellets are supplied to crystallization device 4 or crystallizer 4 for crystallizing the pellets after leaving separation device 3. If necessary, a solid phase (poly)condensation step may also be carried out in a corresponding condensation device 13 after the pellets have been crystallized in the crystallizer.

A cooling fluid circulation system is provided according to FIG. 1, the separated cooling fluid being supplied by separation device 3 to heat exchangers 10 and/or 11 via a reservoir 9 and via filters and pumps as well as suitable valves, these heat exchangers being able to heat or cool the fluid according to the requirements, as indicated by the arrows in FIG. 1.

The cooling fluid that has been cooled or heated in this manner is then (re)supplied to granulation device 1. The cooling fluid circulation system is controlled via a cooling fluid circulation/temperature controller 12, which controls and/or monitors, in particular, the temperatures of the cooling fluid, as indicated by the dotted lines in FIG. 1.

In the device according to the invention illustrated in FIG. 1, a diverting device 6, which is connected to an intermediate storage 5 via valves, is situated between separation device 3 and crystallization device 4. The temperature in intermediate storage 5 is preferably selected so as to prevent the pellets, which are temporarily stored therein and have not yet been crystallized, from sticking together, i.e. the temperature preferably lies below the glass transition temperature of the plastic material from which the pellets are produced. In addition to intermediate storage 5, a waste storage 8 may also be provided, which is able to accommodate any pellets that are no longer to be used.

According to the invention, diverting device 6, which is situated between separation device 3 and crystallization device 4 and which is connected to intermediate storage 5 and waste storage 8, is controllable by a control unit 7, by means of which at least crystallization device 4 may be monitored, such that, in the case of a disturbance of crystallization device 4, the pellets may be supplied to intermediate storage 5 and, once the disturbance has been removed, the pellets temporarily stored in intermediate storage 5 may be supplied to crystallization device 4. After a disturbance has been removed, the pellets temporarily stored in intermediate storage 5 may be (re)supplied to crystallization device 4 via correspondingly designed diverting device 6 or directly. In particular, diverting device 6 may thus be simultaneously designed as a combined recirculation device which is (actively) automatically controllable by control unit 7. According to the invention, the pellets may be supplied to and from the intermediate storage by transporting them, for example, in an air flow, or by a mechanical transport system in the form of worms, conveyor units of a known type or the like.

The device(s) according to the invention, which is/are illustrated schematically in FIG. 1 (as well as the devices illustrated in FIGS. 2 through 4), may also be used to carry out the method according to the invention described above, in particular on the basis of its preferred embodiments.

In the figures, the same reference numerals generally identify the same elements of the invention.

Figure 2:
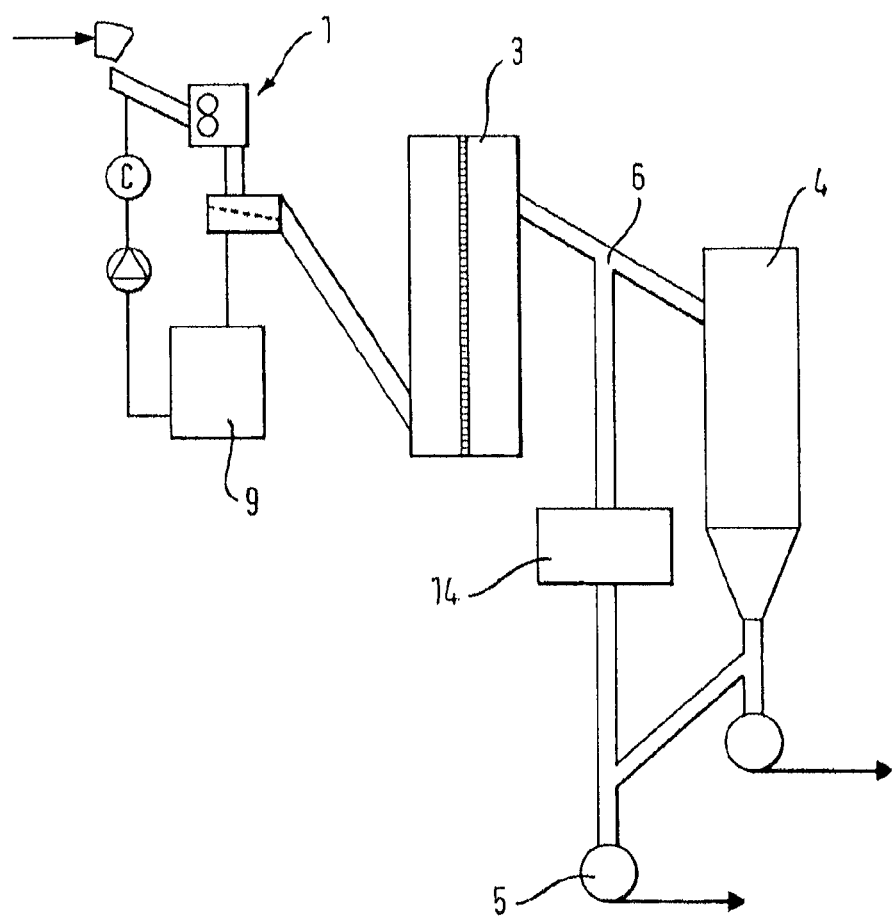
FIG. 2 shows a schematic view of a device for producing and treating pellets made of plastic material according to a further embodiment of the invention.
Figure 3:
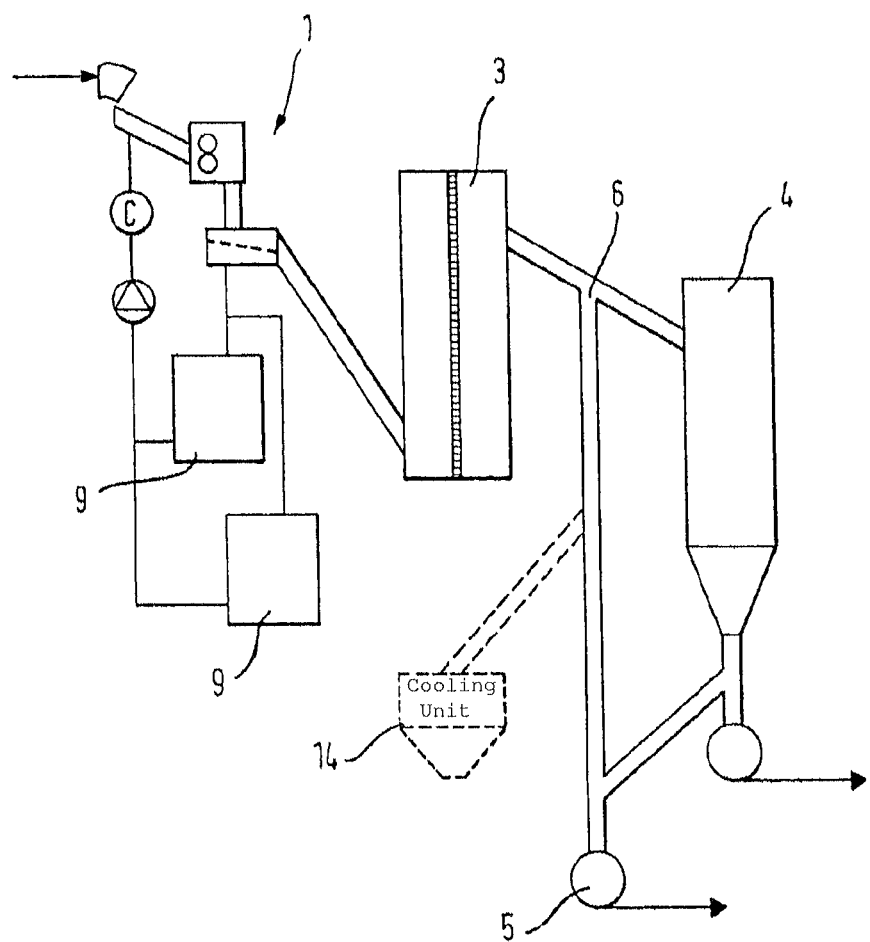
FIG. 3 shows a schematic view of a device for producing and treating pellets made of plastic material according to a further embodiment of the invention.
Figure 4:
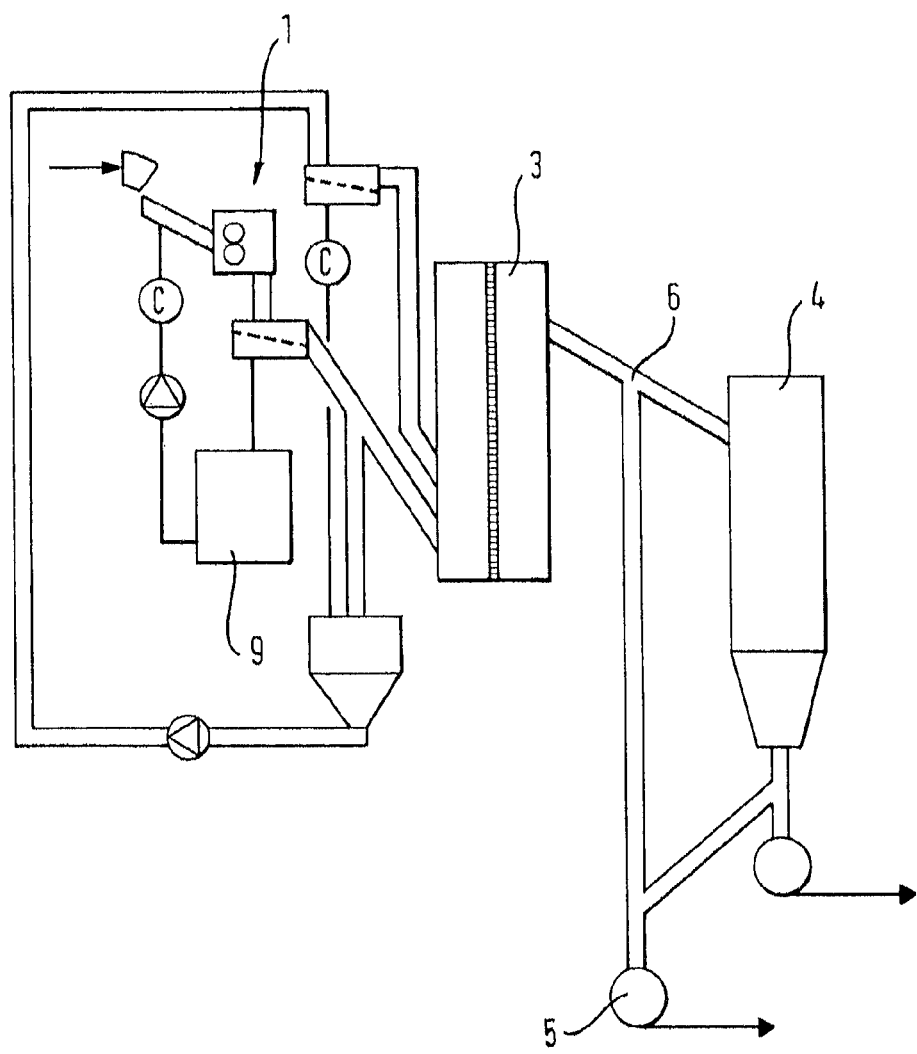
FIG. 4 shows a schematic view of a device for producing and treating pellets made of plastic material according to yet another embodiment of the invention.

FIGS. 2 through 4 illustrate a granulation device as an element of preferred embodiments of the device according to the invention for producing and treating pellets. The embodiments illustrated in FIGS. 2 through 4 refer to granulation device 1, separation device 3 for separating a cooling fluid and a hot water circulation system (tank, startup heater, pump, cooling unit). Crystallization device 4 is situated downstream from separation device 3. An optional oversize separator (not illustrated in the figures) may also be provided between granulation device 1 and separation device 3.

In FIGS. 2 through 4, the arrows following crystallization device 4 and intermediate storage 5 generally indicate that the pellets may also be passed on from these units to a condensation device 13 (SSP), it being possible, in particular, to use intermediate storage 5 as a backup unit.

FIG. 2 shows a schematic view of a device for producing and treating pellets made of plastic material according to a further embodiment of the invention. The embodiment illustrated in FIG. 2 includes an additional cooling device 14 between diverting device 6 and intermediate storage 5, for the purpose of setting the desired temperatures to particularly reliably prevent the diverted pellets from sticking together even if a disturbance of crystallization occurs, and to ensure continuous operation. Cooling device 14 may be gas- or fluid-driven.

The additional embodiment of the invention illustrated schematically in FIG. 3 essentially differs from the embodiment shown in FIG. 2 in that the embodiment in FIG. 3 additionally provides the ability to switch the cooling fluid circulation system from hot water circulation to cold water mode. Separate reservoirs 9 for hot water and cold water make it possible to switch over quickly. When switching from hot water circulation to cold water mode, pellets should either no longer be produced during the transition phase (by briefly interrupting granulation), or (additional) cooling should take place "offline" during switchover, or the produced pellets should be supplied during switchover to a cooling device via a conveyor of a type that is known per se, it being possible for the conveyor to also function as a cooling device.

The further embodiment of the invention illustrated schematically in FIG. 4 essentially differs from the embodiments shown in FIGS. 2 and 3 in that the embodiment in FIG. 4 provides an additional switchover between a water separator and separation device 3, which enables the system to be alternatively operated via an additional cold water circulation system.

The invention claimed is:

1. A method for producing and treating pellets made of a plastic material, comprising:
    granulating a melt of the plastic material to form pellets;
    cooling the pellets in a cooling fluid;
    separating the pellets from the cooling fluid; and
    crystallizing the pellets in a crystallization device;
    wherein a control unit monitors at least the crystallizing of the pellets and controls the method in such a manner that, in case of a disturbance in crystallization of the pellets, the pellets are supplied, via a diverting device situated between a separating device for separating the pellets from the cooling fluid and said crystallization device for crystallizing the pellets and connected with an intermediate storage, to said intermediate storage after separation of the pellets from the cooling fluid, and temporarily stored in the intermediate storage and, once the disturbance has been removed, the pellets temporarily stored in the intermediate storage are supplied to said crystallization device and are crystallized.

2. The method according to claim 1, wherein the plastic material is a thermoplastic condensation polymer.

3. The method according to claim 1, wherein the control unit decreases a temperature of the cooling fluid from a temperature T1 to a temperature T2<T1 in the case of a disturbance in crystallization of the pellets, the temperature T1 being an original temperature of the cooling fluid in the case of no disturbance in crystallization of the pellets, wherein the temperature of the cooling fluid is decreased in such a manner that the pellets present in the cooling fluid are cooled such that the temperature of the pellets supplied to the intermediate storage following the separation step lies within a range in which the pellets do not stick together.

4. The method according to claim 1, wherein the control unit decreases an average temperature of the pellets from a temperature T3 to a temperature T4<T3 in the case of a disturbance in crystallization of the pellets, the temperature T3 corresponding to an average temperature of the pellets prior to crystallization in the case of no disturbance in crystallization of the pellets, and the temperature T4 corresponding to an average temperature of the pellets prior to the intermediate storage, and T4 lying within a range in which the pellets do no stick together in the intermediate storage.

5. The method according to claim 1, wherein, if a disturbance in crystallization of the pellets occurs, the control unit decreases an average temperature of the pellets from a temperature T3 to a temperature T4<T3 after separation of the pellets from the cooling fluid, the temperature T3 lying within a range in which the pellets stick together in the intermediate storage and the temperature T4 lying within a range in which the pellets do not stick together in the intermediate storage.

6. The method according to claim 4, wherein the temperature T4 lies below a glass transition temperature of the plastic material.

7. The method according to claim 4, wherein the temperature T3 lies above the glass transition temperature of the plastic material.

8. The method according to claim 1, wherein, if the disturbance in crystallization of the pellets is removed, the control unit increases an average temperature of the pellets from a temperature T4 to a temperature T5>T4, the temperature T5 corresponding to an average temperature of the pellets prior to crystallization in the case of no disturbance in crystallization of the pellets, essentially corresponding to the temperature T3.

9. The method according to claim 1, wherein a pellet temperature is decreased and/or increased by increasing or decreasing a temperature of at least a portion of the cooling fluid.

10. The method according to claim 1, wherein a pellet temperature is decreased and/or increased by increasing or decreasing a contact time with at least a portion of the cooling fluid.

11. The method according to claim 1, wherein, once the disturbance has been removed, the pellets temporarily stored in the intermediate storage are supplied to crystallization in such a manner that the pellets temporarily stored are mixed with additional pellets and then supplied to the crystallization device according to a fault-free process, the additional pellets being in a quantity of up to 20% of a total mass flow of pellets supplied to the crystallization device.

12. The method according to claim 1, wherein, once the disturbance has been removed, all pellets temporarily stored in the intermediate storage are first supplied to the crystallization device, and additional pellets are subsequently supplied to the crystallization device according to a fault-free process.

13. The method of claim 2, wherein the plastic material comprises polyamide, polyester, polycarbonate, polyactide, polyhydroxyalkanoate, or copolymers or compounds thereof.

14. The method of claim 2, wherein the plastic material comprises polyethylene terephthalate or copolymers thereof.

15. The method of claim 6, wherein the temperature T4 is below 80° C.

16. The method of claim 6, wherein the temperature T4 is below 60° C.

17. The method of claim 7, wherein the temperature T3 is above 80° C.

18. The method of claim 7, wherein the temperature T3 is above 100° C.

\* \* \* \* \*